United States Patent [19]

Hosaka

[11] Patent Number: 5,341,361

[45] Date of Patent: Aug. 23, 1994

[54] INFORMATION RECORDING METHOD CAPABLE OF INCREASING INFORMATION REPRODUCING EFFICIENCY

[75] Inventor: Naoki Hosaka, Tokyo, Japan

[73] Assignee: Olympus Optical Co., Ltd., Tokyo, Japan

[21] Appl. No.: 952,602

[22] Filed: Sep. 28, 1992

[30] Foreign Application Priority Data

Feb. 6, 1992 [JP] Japan .................... 4-021437

[51] Int. Cl.⁵ .............................. G06F 15/40
[52] U.S. Cl. .................... 369/275.3; 360/48
[58] Field of Search ............... 369/275.3, 83, 84, 124; 360/48, 50; 395/425, 400, 275; 235/494

[56] References Cited

U.S. PATENT DOCUMENTS 5,214,781 5/1993 Miki et al. ................... 395/600

Primary Examiner—Paul M. Dzierzynski
Assistant Examiner—Don Wong
Attorney, Agent, or Firm—Frishauf, Holtz, Goodman & Woodward

[57] ABSTRACT

An information recording medium, such as an optical card, has a plurality of sectors of different sizes. First, an optical head records information in those of the sectors which have a predetermined size on the information recording medium. Then, the optical head reproduces information recorded in the sectors having the predetermined size on the recording medium. Then, the optical head records the information, reproduced from those sectors having the predetermined size, in another sector or other sectors among the plurality of sectors on the recording medium, which have a relatively larger size than the predetermined size. Only the information of a desired portion may be extracted at the time of reproduction, and recorded in another sector or sectors at the time of re-recording.

14 Claims, 8 Drawing Sheets

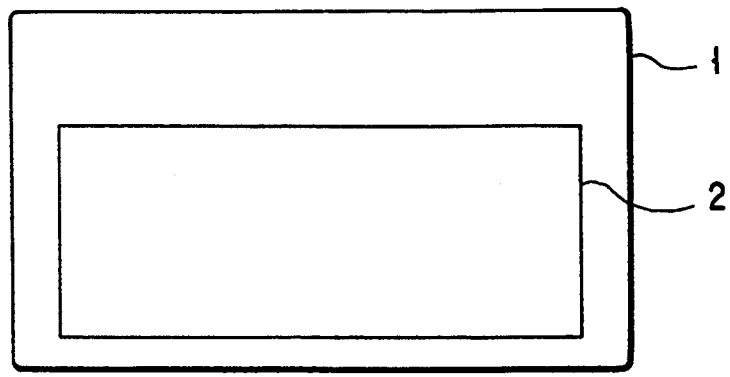
F I G. 1A
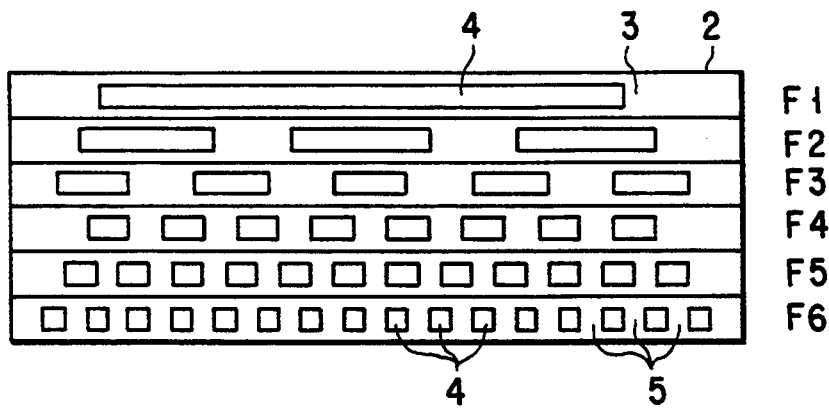
F I G. 1B
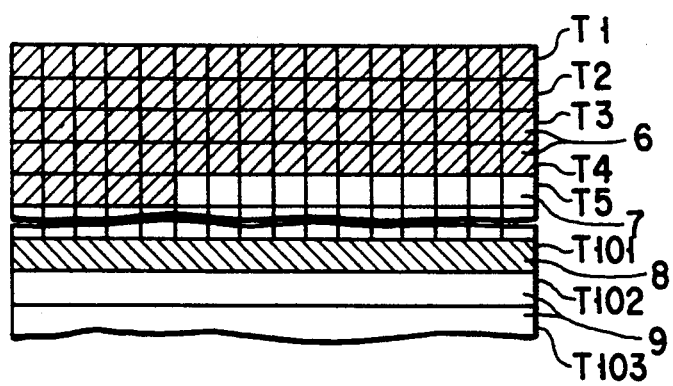
F I G. 2

| | | | | | | | |
|---|---|---|---|---|---|---|---|
| A (F5) | A01 | A02 | A03 | A04 | | A12 | T01 |
| | A13 | A14 | A15 | A16 | | A24 | T02 |
| | A121 | A122 | | | | | T11 |
| B (F1) | B01 | | | | | | T101 |
| | B02 | | | | | | T102 |
| | B03 | | | | | | T103 |
| C (F5) | C01 | C02 | C03 | C04 | | C12 | T201 |
| | C13 | C14 | C15 | C16 | | C24 | T202 |
| | C61 | C62 | C63 | C64 | | C72 | T206 |
| | C73 | | | | | | T207 |
| D (F1) | D01 | | | | | | T301 |
| | D02 | | | | | | T302 |
| | D03 | | | | | | T303 |
| | D04 | | | | | | T304 |
| E (F6) | E01 | E02 | E03 | E04 | | E16 | T401 |
| | E17 | E18 | E19 | E20 | | E32 | T402 |
| | E129 | E130 | E131 | | | | T409 |
| F (F1) | F01 | | | | | | T501 |
| | F02 | | | | | | T502 |
| | | | | | | | T503 |

FIG. 6

| HEIGHT | WEIGHT | VITAL CAPACITY | BLOOD TEST RESULTS ( BLOOD SUGAR VALUE INCLUDED ) |

| URINE TEST RESULTS | BLOOD PRESSURE | EYESIGHT | OTHER | |

FIG. 7

| 101 |
| 102 |
| 103 |
| 104 |
| ... |
| 110 |
| ... |

FIG. 8

| WEIGHT | BLOOD PRESSURE | BLOOD SUGAR VALUE | BLOOD TEST RESULTS ( NO BLOOD SUGAR VALUE INCLUDED ) |

| HEIGHT | VITAL CAPACITY | URINE TEST RESULTS | EYESIGHT | OTHER |

FIG. 9

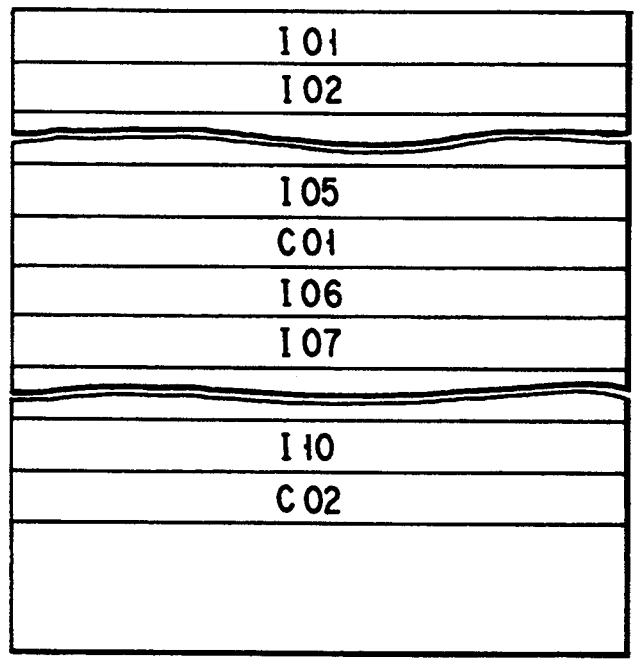
F I G. 13
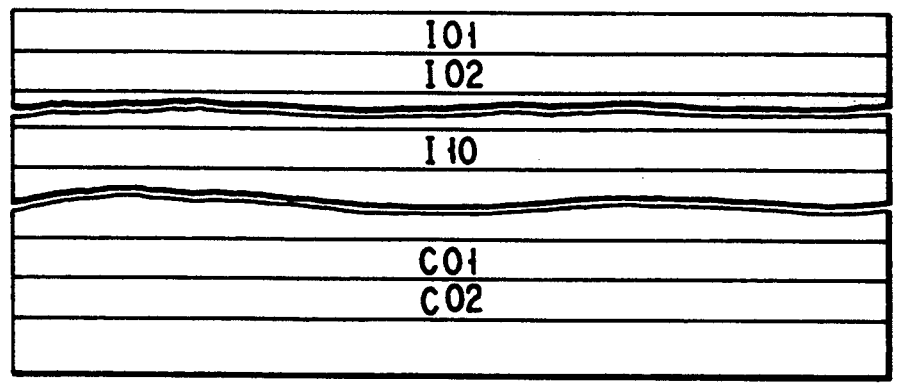
F I G. 14

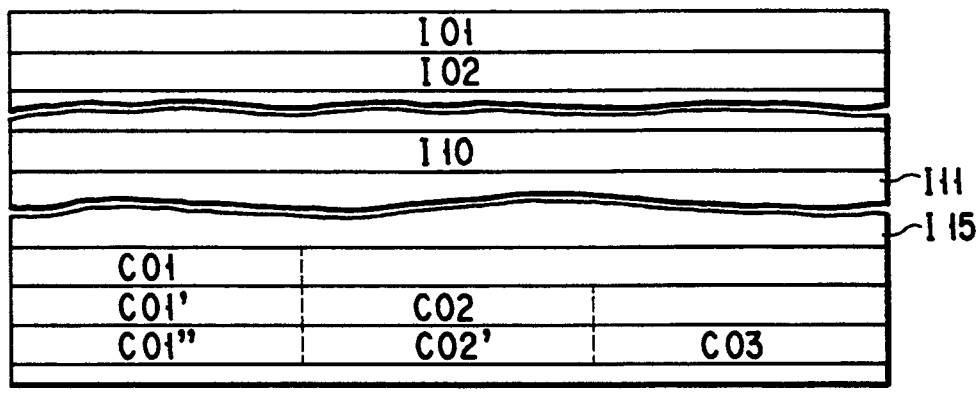
F I G. 15
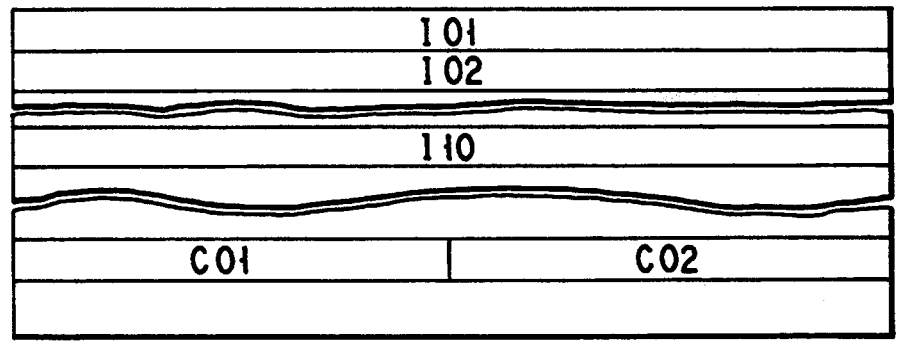
F I G. 16
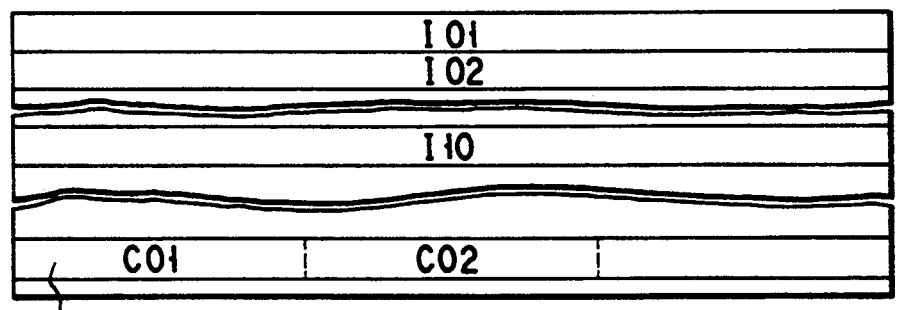
F I G. 17

INFORMATION RECORDING METHOD CAPABLE OF INCREASING INFORMATION REPRODUCING EFFICIENCY

BACKGROUND OF THE INVENTION

1. Field of the Invention

The present invention relates to an information recording method, and, more particularly, to an information recording method capable of increasing information reproducing efficiency.

2. Description of the Related Art

Conventionally, various types of information recording media, such as an optical card, magnetic tape, magnetic disk, optical disk, magneto optical (MO) disk and IC card, have been used for recording information.

Of those information recording media, the optical card has parallel recording tracks formed on a card and records information in the form of pits optically formed on the tracks in association with that information. The optical card is one type of write once and read many (WORM) type information recording media which does not allow recorded information to be rewritten.

On each track on the optical card are provided a single sector or a plurality of sectors which are segmented along the track. The number of sectors on each track can be selected arbitrarily from several types prepared in advance, and one sector becomes the smallest unit at the time of recording or reproducing information.

That is, the number of times information can be recorded on one track on an optical card equals the number of sectors provided on that track. For instance, in recording even one-byte information on an optical card as an information recording medium, only this 1-byte information is recorded in one sector.

In recording or reproducing information through reciprocation of the optical card, information recording or reproducing to or from the whole sectors in one track can be done by a single movement (one-way movement), i.e., forward movement or backward movement. The time required for reproduction of the entire information from one track on an optical card with only one sector formed per track therefore equals that in the case where a plurality of sectors are formed in one track.

The substantial amount of information that can be recorded on one track on an optical card with a plurality of sectors per track is normally smaller than that in the case of one sector formed per track, because of an increase in error correction codes due to the error correcting efficiency of the error correction codes and the need for providing a physical gap between sectors or information or the like to identify the delimitation between sectors.

In recording information, whose occurrence is not predictable in terms of time, on a WORM information recording medium such as the above-described optical card, information is normally recorded sequentially using sectors with as small a size as possible among those sectors having larger sizes the size of that information, thus increasing the number of records of information per track.

The aforementioned magnetic tape, one of various information recording media, normally records information in order from the top of the tape to the end. To reproduce different pieces of information located apart from each other on the tape, one piece after the other, the tape should be sent forward or rewound.

The other types of information recording media, the magnetic disk, optical disk and MO disk, are shaped like a disk. Those recording media each rotate on the disk center and have concentric or spiral information recording tracks, allowing relatively easy recording or reproducing of information located far from each other on the recording medium, jumping over tracks, in addition to sequential information recording/reproduction as done on a magnetic tape. The former recording/reproducing of information however needs the time to jump over tracks to the target location as the recording medium rotates, thus requiring more time than in the case of recording or reproducing information on or from adjacent locations.

The last-mentioned IC card as an information recording medium has a central processing unit (CPU) and a semiconductor memory incorporated into a card. Information is recorded or reproduced electrically, and can be rewritten. The information recording or reproduction is executed by giving a write command and recording information to the CPU in the card or giving a read command to this CPU.

It is always possible that part of recorded information is destroyed in information recording on the aforementioned various types of information recording media. To protect information from corruption, the same information is recorded more than twice on the same information recording medium as one protection scheme.

With the same information recorded redundantly, even when one information is destroyed, the target information can be correctly reproduced if the other redundant information is left undamaged.

Recently, various types of databases have been built with a vast amount of information accumulated in each database. In the medical field, for example, construction of databases on personal information about the results of regular medical checkup, medical treatment records of chronic diseases, or the like has been attempted and those accumulated pieces of personal information have been used in various statistical summing processes or health control of patients by doctors and nurses.

Those databases have been conventionally kept and managed in some institutes or organizations which perform total management of information, such as hospitals, with the necessary information recorded on information recording media having a relatively large memory capacity, such as the aforementioned magnetic tapes, magnetic disks, optical disks or MO disks.

Unless a wide on-line network is fully built, such information managing method does not allow an information user, such as a patient, having his or her information registered in a database, to utilize the accumulated self information if the user does not use the organization where that information is accumulated.

As a solution to this shortcoming, a system has been developed which uses an information recording medium, such as the mentioned optical disk or IC card, having a sufficient memory capacity to store information of one person and excellent in its portability, to record personal information on the medium and allows each user to carry around so that the user can use the self information in different organizations.

For instance, in creating a database of the results of a regular medical checkup conducted by autonomous communities, information on each checkup for individual persons are often collectively recorded. There may be several specific schemes to manage those information. For instance, the information is added to the database as one file or one or multiple records in a specific form. Particularly, in recording information on a WORM type medium, like an optical disk, the recording position of information already recorded cannot be changed, making it inevitable to record information collectively as much as possible in order to keep high recording efficiency.

Such built-up personal data is often used as a reference for doctors, nurses, etc. to give the proper directions or advices to the patients based on the accumulated records of the medical checkups.

In checking and advising many patients in a given period of time as in a group checkup, the time spared for a single patient is limited, so that doctors and nurses cannot actually refer to all the accumulated data for all the patients.

The doctors therefore usually give directions, referring to ordinary data indicative of the health conditions, such as the weight, the value of blood pressure and the value blood sugar, in addition to the latest checkup results.

The required data, such as the old weights, blood pressure values, and blood sugar values, are recorded together with the results of other checkups for each checkup date, and the recording positions of old data are located apart from one another. This lowers the information reproducing efficiency with respect to the time.

For instance, to find out the last ten values of the weight, the information on the weight should be read out from each of ten recording blocks recorded on the information recording medium. With the use of a magnetic tape, it is inevitable to feed the tape forward every time information for one block is obtained, while with the use of a disk-shaped information recording medium or an optical card, track jumping should be performed to access ten locations on the medium.

When an IC card is used, ten information reproducing commands should be issued to the CPU in the card to attain the information on the ten events.

To reproduce information sequentially recorded on the optical card, in particular, the information should be reproduced in order from the first sector where the recording of the information starts. This provides a smaller amount of information obtainable per track, resulting in a lower information reproducing efficiency with respect to the time required for the reproduction.

In the case where one piece of information is recorded more than once, e.g., twice, on the same information recording medium, the area of that information occupying on the information recording medium becomes twice as large as that in the case where no redundant recording is performed, thus reducing the substantial amount of information recordable on the whole information recording medium.

SUMMARY OF THE INVENTION

It is therefore an object of the present invention to provide a new and improved information recording method which can increase the information reproducing efficiency with respect to the time when plural pieces of recorded information are reproduced and can protect information against accidental destruction of the information using as smaller an area as possible.

According to a first aspect of the present invention, there is provided a method for recording information on an information recording medium having a plurality of sectors including those of different physical sizes, the method comprising:

a first recording step of recording information in those of the plurality of sectors on the information recording medium which have a predetermined size;

a step of reproducing the information recorded in the sectors having the predetermined size on the information recording medium; and a second recording step of recording the information reproduced in the reproducing step, in a sector or sectors among the plurality of sectors on the information recording medium, which have a size greater than the predetermined size.

According to a second aspect of the present invention, there is provided a method for recording information on an information recording medium having a plurality of sectors including those of different physical sizes, the method comprising:

a first recording step of recording information in those of the plurality of sectors on the information recording medium which have a predetermined size;

a reproducing step of performing information reproduction to extract a desired portion of each pieces of the information recorded in the sectors having the predetermined size on the information recording medium; and a second recording step of recording information on the extracted desired portion reproduced in the reproducing step, in another sector or other sectors among the plurality of sectors on the information recording medium, which have a size greater than the predetermined size.

According to a third aspect of the present invention, there is provided a method for recording information on an information recording medium having a plurality of sectors including those of different sizes, the method comprising:

a first recording step of recording information in first and second groups of sectors among the plurality of sectors on the information recording medium, the first and second groups of sectors having a predetermined size;

a first reproducing step of performing information reproduction to extract a first desired portion from each pieces of the information recorded in the first group of sectors having the predetermined size on the information recording medium;

a second recording step of recording information on the extracted first desired portion reproduced in the first reproducing step, in another sector among the plurality of sectors on the information recording medium;

a second reproducing step of performing information reproduction to extract a second desired portion from each pieces of the information recorded in the second group of sectors in the first recording step; and a third recording step of recording information on the extracted second desired portion reproduced in the second reproducing step, in the same area as the another sector or a different sector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIGS. 1A and 1B are diagrams illustrating an example of an optical card used in the present invention and a specific example of an optical recording member in the optical card;

FIG. 2 is a diagram for explaining a first embodiment of the present invention;

FIG. 6 is a diagram for explaining a file managing system to which the first embodiment is applied;

FIG. 7 is a diagram showing an example of a group of information used in the present invention;

FIG. 8 is a diagram for explaining a specific example of recording the information group shown in FIG. 7;

FIG. 9 is a diagram illustrating a modification of the information group in FIG. 7;

FIG. 13 is a diagram showing another modification of the second embodiment;

FIG. 14 is a diagram for explaining an example in which the optical card of the second embodiment is used;

FIG. 15 is a diagram for explaining an example in which an optical card is used as a third embodiment;

FIG. 16 is a diagram for explaining a modification of the third embodiment as a fourth embodiment;

FIG. 17 is a diagram for explaining an example in which a rewritable medium is used as a fifth embodiment;

DETAILED DESCRIPTION OF THE PREFERRED EMBODIMENTS

Figure 3:
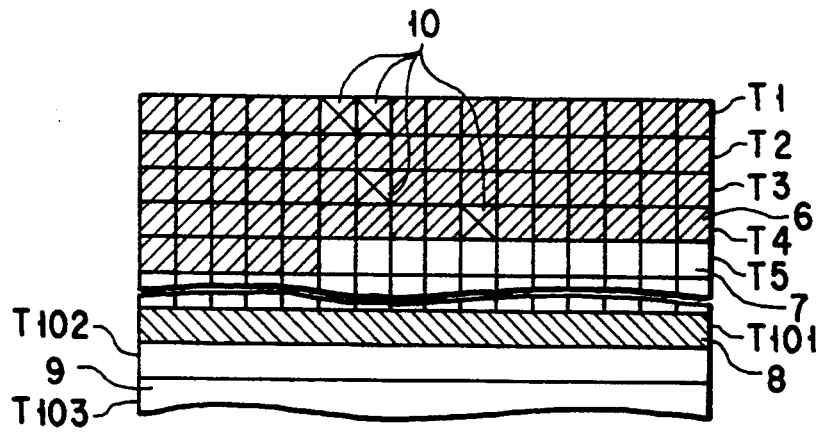
FIG. 3 is a diagram for explaining a modification of the first embodiment of the present invention.

Reference will now be made in detail to the presently preferred embodiments of the invention as illustrated in the accompanying drawings, in which like reference characters designate like or corresponding parts throughout several drawings.

FIG. 1A exemplifies an optical card as an information recording medium adaptive in the information recording method of the present invention.

As illustrated, an optical card 1 has an optical recording member 2 formed on its surface to optically record information. As shown in enlargement in FIG. 1B, the optical recording member 2 is provided with a plurality of tracks 3 for information recording, which run parallel to one another along the optical card 1.

Each track 3 has a single sector or multiple sectors 4 formed in its lengthwise direction; a gap 5 is provided between the sectors 4 in the latter case.

There are six types (F1 to F6) of recording formats for the sectors 4, and the size of each sector and the number of sectors that can be formed on a single track are given in the left and center columns in the following Table 1.

The right column in Table 1 shows a memory capacity per track for each recording format.

TABLE 1

| | Sector Size (bytes) | Number of Sectors Per Track | Memory Capacity Per Track (bytes) |
|---|---|---|---|
| F1 | 1024 | 1 | 1024 |
| F2 | 256 | 3 | 768 |
| F3 | 128 | 5 | 640 |
| F4 | 64 | 8 | 512 |
| F5 | 32 | 12 | 384 |
| F6 | 16 | 16 | 256 |

The speed of recording or reproducing information on or from the tracks 3 on the optical card 1 is about several kilobytes per second, which is slower than that for a disk-shaped recording medium that can be rotated at a high speed.

The following will describe an information recording method according to a first embodiment of the present invention.

FIG. 2 illustrates the information recording states of tracks T1 to T103 of the optical card 1. The individual tracks have four types of sectors: sectors 6 on which information has already been recorded using the information recording format F6, unrecorded sectors 7 in the format F6, sector 8 on which information has already been recorded using the information recording format F1, and unrecorded sector 9 in the format F1.

Suppose that information which has a size of 16 bytes and whose occurrence is not predictable has been recorded in order from the left end of the track T1 upon each generation to fill up all of 64 sectors up to the track T4. Please refer to FIG. 19 and a later description on this diagram for a specific way of making such recording.

Those 64 pieces of information are to be sequentially reproduced and are simply linked to provide 1024-byte information, which is in turn recorded on the track T101 in the recording format F1. That is, the information recorded on the tracks T1 to T4 are collectively recorded further on the track T101. Please refer to FIG. 19 and the later description on this diagram for a specific way of achieving the same.

When it becomes necessary to reproduce the information from the tracks T1 to T4, the information on the track T101 will be reproduced instead. This involves a reproducing operation for a single track, reducing the time required for reproduction of the same amount of information by one forth of the time needed for reproduction of information from four tracks T1-T4 and increasing the information reproducing efficiency with respect to the time to four times accordingly.

According to this recording method, as quite the same information is recorded at two locations on a single optical card, if one of those information is destroyed and cannot be reproduced due to some reasons, the other information can be reproduced without any problem so that a user can easily obtain the intended information. This recording scheme thus enhances the reliability of information recording.

The conventional method of recording information, upon each generation thereof, on one area and spare or dummy information on another area of the same information recording medium causes 64 pieces of spare information to occupy four tracks, whereas 64 pieces of spare information occupy only one track in this embodiment, thus increasing the memory efficiency.

The information recording method according to the first embodiment can be modified in various manners.

In the first embodiment, all of 64 pieces of information generated separately are linked and the resultant information is recorded on the track T101. If there are pieces of information 10 on the tracks T1, T3 and T4, which become unnecessary when the 64-th piece of information is recorded, for instance, the information on those sectors are deleted at the time of information recording on the track T101, allowing only 60 pieces of information to be actually recorded on the track T101, as shown in FIG. 3.

Alternatively, in consideration of four out of 64 pieces of information becoming unnecessary, information recording on the track T101 may not be performed at that point of time, but when four additional pieces of information are added on the track T5, all the necessary 64 pieces of information may be linked to be recorded on the track T101.

Further, if information is not generated frequently, before generation of 64 pieces of information, e.g., when 32 pieces (for two tracks) are generated, those pieces of information may be linked and recorded on a single track T101.

Figure 4:
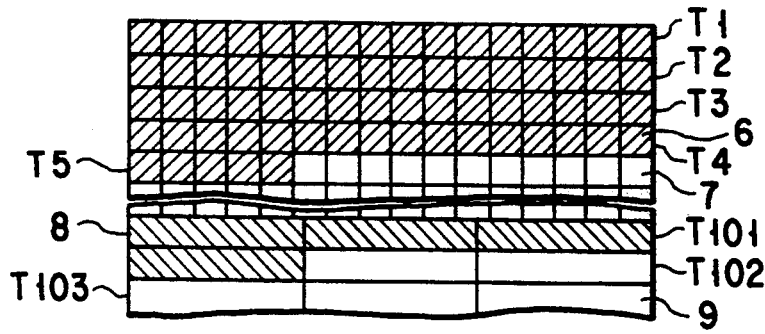
FIG. 4 is a diagram for explaining another modification of the first embodiment of the present invention.

Although the linked information is recorded in a single sector in the recording format F1 of the largest size, every 16 pieces of information may be linked and recorded in a sector in the recording format F2, so that 64 pieces of information will be recorded in four sectors in the recording format F2 on the tracks T101 and T102, as shown in FIG. 4.

If each information to be recorded is smaller than the size of sectors in the recording format F6, which are used to record that information, e.g., in the case of 8-byte information, at the time pieces of information are linked and recorded in the sectors in the recording format F1, a total of 128 pieces of information, greater than that in the above case, can collectively be recorded.

Figure 5:
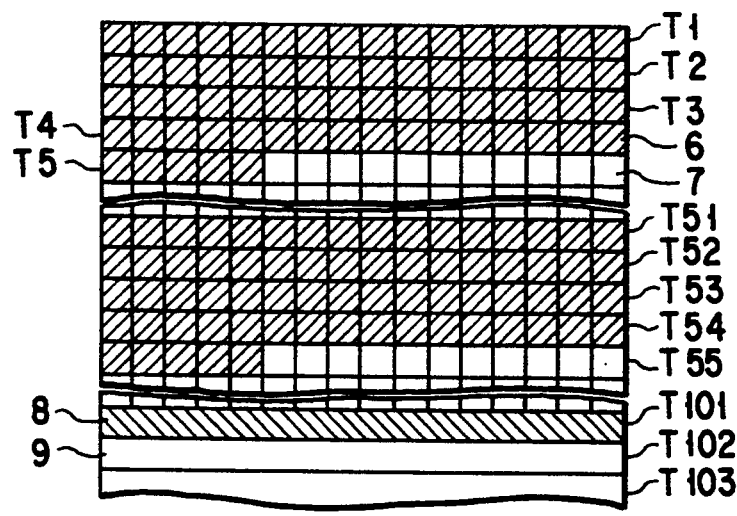
FIG. 5 is a diagram for explaining a further modification of the first embodiment of the present invention.

Furthermore, as shown in FIG. 5, even when one piece of information (less than 512 bytes) is recorded redundantly at two locations on the tracks T1 to T5 and tracks T51 to T55, linking those pieces of information and recording the resultant information on a track following the track T101 can enhance the information reproducing efficiency with respect to the time and the reliability of the information recording.

As a specific application of the first embodiment that can be modified in various manners as described above, there is a file managing system which is created on the optical card as shown in FIG. 6.

As illustrated in this diagram, six areas A to F are provided on this optical card.

In the area A is recorded information such as the names and sizes of files to be recorded on the optical card in the recording format F5, the recording positions on the optical card, the dates of their preparation and the attributes of the files. In the area B, actual data of each file is recorded using the recording format F1.

The area C is a backup area which is used when the information in the area A is changed, and has the same recording format F5 as the area A.

The area D is a backup area which is used when the information in the area B is changed, and has the same recording format F1 as the area B. The area E serves to record backup information using the recording format F6.

The area F is an area which is newly added to work out the present invention and where a single piece of information acquired by linking 64 pieces of backup information recorded in the area E is recorded in the recording format F1.

Assuming that 131 pieces of backup information have been recorded in the area E, the information reproducing time for a total of nine tracks (tracks T401 to T409) is needed to reproduce the entire backup information using the conventional method. In this case, of the backup information in the area E, 64 pieces of information on the tracks T401 to T404 are linked and recorded on the track T501 while 64 pieces of information on the tracks T405 to T408 are linked and recorded on the track T502 in the area F.

To reproduce 131 pieces of backup information, therefore, instead of reproducing the backup information on eight tracks T401 to T408, the linked backup information on the two tracks T501 and T502 and the information on the track T409 need to be reproduced, thus requiring the information reproducing time for three tracks instead of eight. The information reproducing efficiency with respect to the time thus becomes three times higher.

In the file managing system according to this application, since the optical card is a WORM type, when the name and data of a file already recorded are changed, information after alteration will be recorded in a backup area previously secured on the same optical card without processing the information to be altered.

Backup information indicating which information is recorded which backup area is recorded on a backup information area also previously secured on the same optical card.

This scheme allows alteration of once-recorded information on a WORM type optical card. In this case, to correctly reproduce the information of a file on the optical card, the present system should reproduce and store the whole backup information before reproducing the information of that file.

According to this file managing system, although there is a possibility that backup information is damaged and becomes unreproducible, making reproduction of any information impossible, over the entire files on the optical card, the use of the area F can protect information from this possible event.

Although pieces of backup information in the area E are linked together and the resultant information is recorded in the area F in the above application, the file information in the area A instead of the backup information in the area E may be linked and then recorded in the area E. Further, the above-described various modifications can also applied to this file managing system.

The foregoing description has been given on the embodiment of the information recording method for to recording information, recorded in a plurality of sectors on an information recording medium having sectors of a predetermined size, in sectors which are less in number than the former sectors. A description will now be given of an embodiment of the information recording method for extracting a part of information recorded in a plurality of sectors on the same recording medium and then recording the extracted information on that recording medium.

FIG. 7 illustrates the results of a single medical checkup as an example of suitable information for the application of the information recording method of the present invention. Various groups of information included in the checkup results are treated as one group, and the whole groups of information are stored in a single sector when being recorded on an information recording medium.

FIG. 8 presents a conceptual diagram illustrating the way several pieces of information on the results of multiple medical checkups conducted on one patient are accumulated, the results of each checkup being shown in FIG. 7. In each of sectors I01 to I10 are recorded groups of information on the results of a single medical checkup as shown in FIG. 7.

Let us consider the case where in a group checkup, to give advices on the health control of the person, a doctor or the like refers to the accumulated information on the checkup results for that person to examine, as a reference material, time-sequential changes in the weight values, blood pressure values and blood sugar values from the past ones to the latest ones.

If different pieces of information are collectively recorded checkup by checkup as shown in FIG. 8, part or all of each group of information recorded in the sector I01, I02 . . . , or I10 is to be reproduced to acquire the mentioned three types of information entirely. That is, there are greater pieces of information that should be reproduced than are actually necessary, lowering the substantial information reproducing efficiency.

If the information recording format is improved and the recording positions of the three types of information are arranged differently as shown in FIG. 9, the head portion of each piece of information on the results of the last ten medical checkups should still be reproduced.

An information recording method according to a second embodiment will be described referring to FIG. 10.

Figure 10:
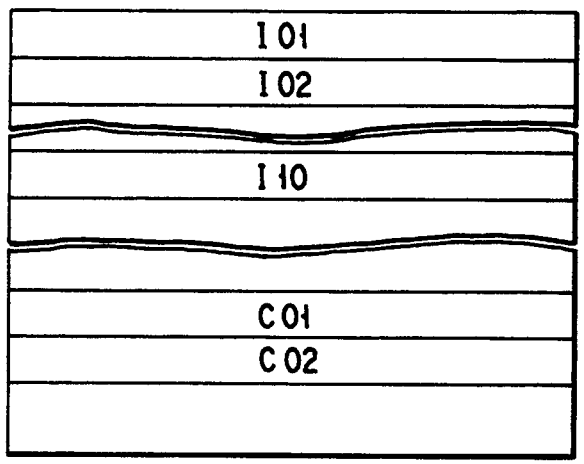
FIG. 10 is a diagram illustrating a second embodiment of the present invention.

First, ten medical checkups are to be conducted on one person, providing information as shown in FIG. 7, and the information on the checkup results are recorded in sectors I01 to I10 as shown in FIG. 10. The weight value, blood pressure value and blood sugar value are extracted from each of the information groups stored in the sectors I01-I10. Then, the three types of checkup results for every five checkups are collected and are recorded again in sectors C01 and C02 in such a way that the information groups stored in the sectors I01-I05 are stored in the sector C01 and the information groups stored in the sectors I06-I10 are stored in the recording format as shown in FIG. 11 or 12.

Figure 11:
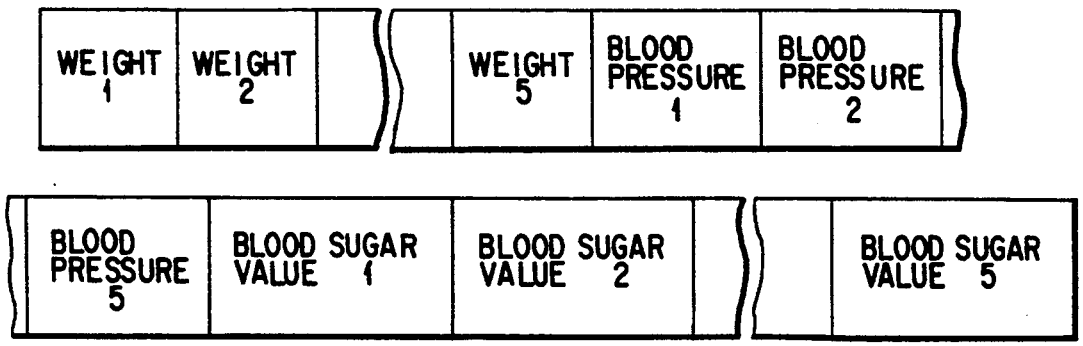
FIG. 11 is a diagram for explaining information extracted in the second embodiment invention.
Figure 12:
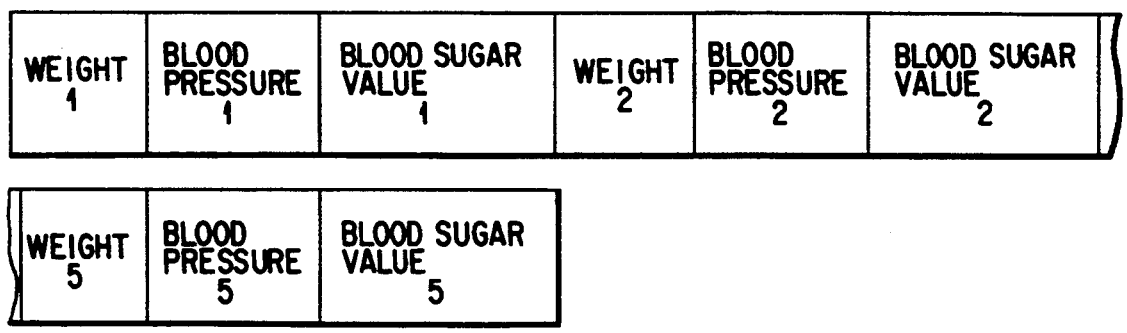
FIG. 12 is a diagram showing a modification of the second embodiment.

It should be noted that each block in FIG. 11 or 12 representing each piece of information merely indicates the presence of that information, and the area of that block does not indicate the amount of information.

To reproduce the mentioned three types of old information, information recorded in the sectors C01 and C02 should be reproduced. The conventional method requires the time for reproducing ten pieces of information piece by piece plus the time for reproducing other information than is actually needed, whereas the present method requires two procedures for the required information reproduction.

In addition, since information that is actually reproduced is no more than what is necessary, the desired information can be acquired quicker in this embodiment than in the prior art.

Although information to be recorded is the results of medical checkups in this embodiment, information to which the present invention is applicable is not limited to such type. It may be service charges and information on a repair man in the repair history information of goods, or other type of information.

A group of information to be recorded should not necessarily be recorded in one sector as shown in FIG. 7, but may be recorded in a plurality of sectors.

In addition, extracted information may be recorded in a sector having a smaller size than the original sector.

The recording formats for information need not be the same as are shown in FIGS. 7 through 12. For instance, the recording arrangement in FIG. 10 may be changed to what is shown in FIG. 13 or may take other forms of arrangement. The same is true of the other diagrams.

While pieces of information for five checkups are collected into one information to be recorded in this embodiment, the number of checkups is not limited to five but may take other values as well. The number can be determined arbitrarily in the light of the information reproducing speed of an information recording medium, the number of pieces of information that are actually recorded, the smallest information recording unit of the recording medium, etc.

The information recording method according to the second embodiment is applicable to a magnetic tape, a magnetic disk, an optical disk, an optical card, an IC card and any other information recording medium.

When this embodiment is applied to an optical card, groups of information recorded in the sectors I01 to I10 are recorded in sectors C01 and C02 as shown in FIG. 14.

If the information reproducing speed of an optical card is 5 tracks per second, for example, the time required to reproduce all of the three types of information is just 0.4 sec using the information recorded in the sectors C01 and C02 whereas it takes two seconds using the information groups recorded in the sectors I01 to I10.

The values given above of course vary depending on the recording format in use, but the advantages of the present invention are apparent. Even if the information reproducing speed of an optical card is improved in the future, the same advantages are obtained.

Although one sector is formed per track in FIG. 14, a plurality of sectors may be formed per track and all the sectors need not have the same size.

With the use of a recording medium that records information in semiconductor memory, such as an IC card, the reproducing head will not be physically moved to separate recording positions, hardly needing an extra reproducing time as required for other card type, tape type and disk type recording media.

with the use of an IC card, however, some data and command exchanges with the CPU on the IC card are necessary to acquire the recorded information.

The use of the recording method of the present invention can reduce the number of such processes and can eliminate an extra reproducing time too.

Information recording is normally executed sector by sector. With the use of a WORM type recording medium such an optical card, in particular, even if information to be actually recorded is smaller in size than one sector, one sector is entirely used when recording such information.

For instance, if the amount of each piece of information to be collectively recorded, such as three pieces of information, weight, blood pressure value and blood sugar value, among a group of information recorded in each of the sectors I01–I10 in the second embodiment, is sufficiently smaller than the amount of the entire information, plural pieces of information even when collected may be smaller in size than the sector used to record the original information.

In short, the second embodiment can reproduce part of each piece of information from an information recording medium having plural pieces of information already recorded thereon and can collectively record the reproduced multiple pieces of information again on the recording medium.

Therefore, the greater the amount of information and the number of pieces of information to be recorded become or the slower the information reproducing speed of an information recording medium is, the more prominent the advantages of the present invention become.

FIG. 15 is a diagram for explaining an information recording method according to a third embodiment, which is a modification of the second embodiment.

A description will be given below of the case where the size of information to be collectively recorded on an optical card is one third of the original information. Each rectangular area in FIG. 15 represents a single track on the optical card.

The aforementioned three types of information extracted from the sectors I01–I05 are collectively recorded in the sector C01 as done in the second embodiment. The actual area of the sector C01 that is used in this recording is only one third.

Then, the information extracted from the sectors I05–I10 is recorded in the sector C02. At this time, the information already recorded in the sector C01 is reproduced and recorded again in a sector C01'.

To reproduce the necessary information, the sector C01 will not be reproduced, but the track having the sectors C01' and C02 will be accessed.

Although this scheme uses the same number of sectors for collective recording of information as used in the second embodiment, it can allow the information in the sectors C01 and C02 to be reproduced in a single access once the information is recorded in the sector C02, thus further shortening the reproducing time.

When groups of information are recorded in sectors I11 to I15, those pieces of information extracted from the sectors I11–I15 have only to be recorded in a sector C03 while recording the information in the sectors C01' and C02 respectively in sectors C01'' and C02', allowing the entire information required to be recorded on a single track.

The specific values given above, such as the amount of information, are not restrictive, but may take other values as well.

Although the description of this embodiment has been given with reference to an optical card, this method has an advantage of shortening the information reproducing time of any other recording medium as long as the recording medium is of a WORM type, such as an optical card, which does not allow for rewriting of information once recorded thereon.

This method is also applicable to a rewritable recording medium, in which case the information reproducing time is also shortened.

In short, with the use of an information recording medium having plural pieces of information already recorded and redundant information already recorded by the information recording method of the second embodiment, the third embodiment can reproduce part of each of the already-recorded multiple pieces of information together with the redundant information recorded by the information recording medium of the second embodiment, and can then record all the reproduced pieces of information collectively again on the recording medium.

FIG. 16 is a diagram for explaining an information recording method according to a fourth embodiment, which is a modification of the third embodiment. A description will also be given of the case where an optical card is used and the size of information to be collectively recorded on the optical card is one third of the original information as in the third embodiment.

The aforementioned three types of information extracted from the sectors I01–I05 are collectively recorded in the sector C01 as done in the third embodiment. The sector C01 that is used in this recording is smaller in size (e.g., a half) than the sector that is used to record the original information.

At the time the information extracted from the sectors I05–I10 is recorded in the sector C02, it is recorded in an unused area on the same track as the information-recorded sector C01 lies.

To reproduce the necessary information, the sector C02 together with the sector C02 will be reproduced.

This scheme reduces the number of sectors used for collective recording of information, a half of the sectors used in the first embodiment, and can shorten the reproducing time.

The above specific values, such as the amount of information and the sector size, are not limited to those given above, but may take other values as well as in the third embodiment.

Although the description of this embodiment has been given with reference to an optical card, this method is applicable to any other recording medium which ensures selection of multiple sizes of sectors, and has an advantage of shortening the information reproducing time in that case too.

Although, for redundant recording, this embodiment uses a sector smaller in size than that sector which is used to record the original information, a sector having a larger size than the latter one may also be used.

In short, with the use of an information recording medium having plural pieces of information already recorded and having information-recording sectors of different sizes, the fourth embodiment can reproduce part of each of the already-recorded multiple pieces of information together and can then record the reproduced pieces of information collectively again on the recording medium using a sector different in size from those used for the original information.

FIG. 17 is a diagram for explaining an information recording method according to a fifth embodiment, which is a modification of the third embodiment. This embodiment involves a rewritable information recording medium such as a magnetic disk, an MO disk or an IC card, and its description will be given of the case where the size of information to be collectively recorded is one third of the size of the original information. Each elongated rectangular area in FIG. 17 represents the minimum unit of information recording of a recording medium, such as a sector, not the physical positional relation of information.

The aforementioned three types of information extracted from the sectors I01-I05 are collectively recorded in a sector K01 as done in the third embodiment. The sector K01 that is used in this recording has the same size as the sectors I01-I05, but only one third is used.

At the time the information extracted from the sectors I05-I10 is recorded in the sector C02, it is recorded in an unused area of the sector K01 that has been used for the previous recording.

Actually, the sector K01 is accessed first to reproduce the information C01 and a collection of the information C01 and C02 is rewritten in the sector K01 where the information C01 has been recorded.

If the amount of information increases and additional information is recorded in the sectors I11-I15, an area C03 has only to be added in the unused area in the sector K01 to record that information.

This scheme reduces the number of sectors used for collective recording of information, one third of the sectors used in the third embodiment, and can shorten the reproducing time.

The above specific values, such as the amount of information, are not limited to those given above, but may take other values as well as in the third embodiment.

Since a rewritable recording medium is used, every time one piece of information is recorded, extracted information may be recorded in a specific sector for collective recording, instead of recording five pieces of information collectively.

Figure 18:
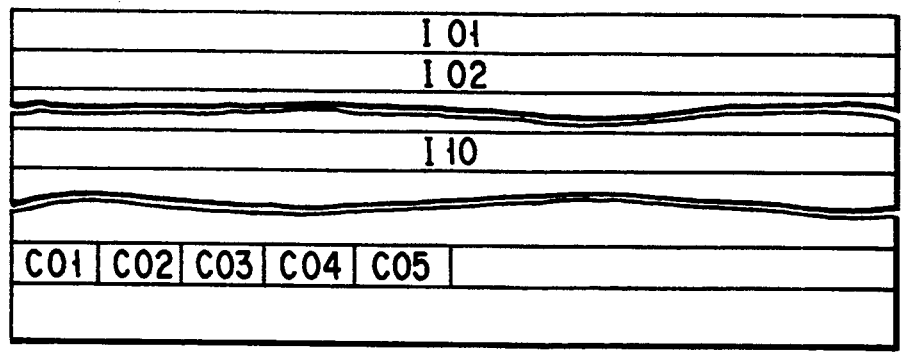
FIG. 18 is a diagram for explaining a modification of the fifth embodiment as a sixth embodiment.

FIG. 18 is a diagram for explaining an information recording method according to a sixth embodiment of the present invention, a modification of the fifth embodiment.

According to the information recording method of this embodiment, which uses an optical card, after one piece of information is recorded, necessary information is immediately extracted from it and is recorded in a sector smaller in size than the sector that is used to record the original information.

After the first information is recorded in the sector I01, the aforementioned three types of information are extracted from it and are recorded in the sector C01. This sector C01 is formed by a recording format that allows 12 sectors to be recorded per track. Likewise, information extracted from the sector I02 is recorded in the sector C02, information extracted from the sector I03 is recorded in the sector C03, and so forth.

This recording scheme allows a maximum of 12 extracted pieces of information to be recorded per track, shortening the time for reproducing the necessary information.

Unlike the second embodiment that records every five pieces of information collectively, the sixth embodiment can record the pieces of information extracted from the whole original information regardless of the number of original pieces of information within the maximum value.

The above specific values, such as the amount of information and the sector size, are not limited to those given above, but may take other values as well as in the second embodiment.

Although this embodiment uses a single sector smaller than the sector that is used to record the original information, a plurality of further smaller sectors may be used for recording of the extracted information.

Although the foregoing description of this embodiment has been given of the case where an optical card is used, this method is applicable to any other recording medium as long as it can ensure selection of multiple sector sizes, and can shorten the information reproducing time in the latter case.

Figure 19:
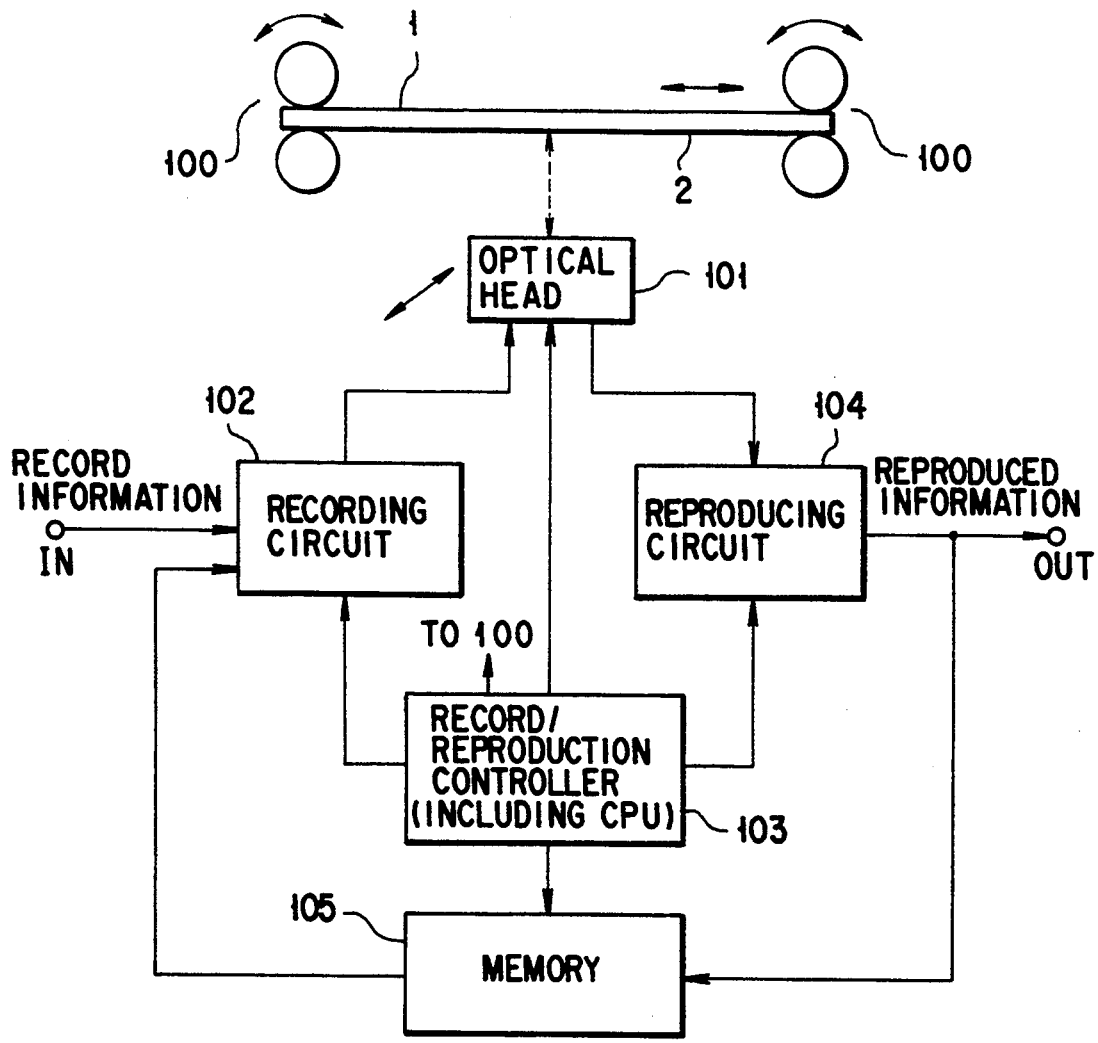
FIG. 19 is a diagram illustrating a specific structure which is used in the individual embodiments.

FIG. 19 illustrates a specific structure used in the individual embodiments described above.

Information to be recorded coming from an input terminal IN is sent through a recording circuit 102 to be recorded in a predetermined sector described above, on an optical recording member 2 on an optical card 1 by an optical head 101 under the control of a record/reproduction controller including a CPU.

The optical card 1 is movable back and forth along a track by a drive mechanism 100. The optical head 101 is freely movable in a direction perpendicular to the lengthwise direction of tracks by a drive mechanism (not shown).

At the time of reproduction, the information recorded on the optical card in the above-described manner is sent through a reproducing circuit 104 from the optical head 101, as reproduced information, to an output terminal OUT.

In this case, the reproduced information from the reproducing circuit 104 is sent through a memory 105 as needed, and through the recording circuit 102 again to be recorded in another predetermined sector (different from the one used in the first recording), also discussed earlier, in the optical recording member on the optical card 1 by the optical head 101 under the control of the record/reproduction controller 103.

As described above, in recording information on an information recording medium having sectors of predetermined sizes, the present invention can record pieces of information recorded in multiple sectors on the same recording medium to be recorded in fewer sectors than the multiple sectors, thus increasing the substantial amount of information that can be recorded on the entire recording medium.

Since part of information recorded in multiple sectors on the same recording medium can be extracted and recorded again on this recording medium, the information reproducing efficiency with respect to the time required for reproduction can be improved.

The present invention thus provides an information recording method that can increase the information reproducing efficiency with respect to the time at the time plural pieces of information additionally are recorded on an information recording medium.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A method for recording information on an information recording medium having a plurality of sectors including sectors of different physical sizes, said method comprising:
   a first recording step of recording information in those of said plurality of sectors on said information recording medium which have a certain size other than a largest size of the different sizes;

a step of reproducing said information recorded in said sectors having said certain size on said information recording medium; and a second recording step of recording said information reproduced in said reproducing step, in a sector or sectors among said plurality of sectors on said information recording medium, wherein said sector or sectors has or have a size greater than said certain size.

2. The method according to claim 1, wherein said second recording step includes recording said reproduced information after deleting unnecessary information from said reproduced information.

3. The method according to claim 1, wherein said second recording step includes recording said reproduced information in the largest size sector.

4. The method according to claim 1, wherein said second recording step includes recording said reproduced information in sectors other than the largest size sector.

5. The method according to claim 1, comprising recording said information on an optical card recording medium.

6. The method according to claim 5, wherein:

said first recording step comprises recording plural pieces of backup information in a file managing system built on said optical card recording medium; and said second recording step is used for linked recording of said plural pieces of backup information.

7. A method for recording information on an information recording medium having a plurality of sectors including sectors of different physical sizes, said method comprising:

a first recording step of recording information items in those of said plurality of sectors on said information recording medium which have a certain size other than a largest size of the different sizes;

a reproducing step of performing information reproduction to extract a desired portion of said information items recorded in said sectors having said certain size on said information recording medium; and a second recording step of recording information on said extracted desired portion reproduced in said reproducing step, in another sector or other sectors among said plurality of sectors on said information recording medium, which have a size greater than said certain size.

8. The method according to claim 7, wherein:

said information recorded in said first recording step is information on a plurality of medical checkups of a person, and said information on a medical checkup includes a plurality of data about a weight, blood pressure value, blood sugar value and other items of said person.

9. The method according to claim 8, wherein said extracted information of said desired portion, reproduced in said reproducing step, includes at least data about said weight, blood pressure value and blood sugar value of said person for each medical checkup among said information on a plurality of medical checkups.

10. The method according to claim 7, comprising recording said information on an optical card recording medium.

11. A method for recording information on an information recording medium having a plurality of sectors including sectors of different physical sizes, said method comprising:

a first recording step of recording information in first and second groups of sectors among said plurality of sectors on said information recording medium, said first and second groups of sectors each having a certain size;

a first reproducing step of performing information reproduction to extract a first desired portion from said information recorded in said first group of sectors having said certain size on said information recording medium;

a second recording step of recording information on said extracted first desired portion reproduced in said first reproducing step, in another sector among said plurality of sectors on said information recording medium;

a second reproducing step of performing information reproduction to extract a second desired portion from said information recorded in said second group of sectors in said first recording step; and a third recording step of recording information on said extracted second desired portion reproduced in said second reproducing step, in a same area as said another sector or in a different sector.

12. The method according to claim 10, wherein:

said information recorded in said first recording step is information on a plurality of medical checkups of a person, and said information on a medical checkup includes a plurality of data about a weight, blood pressure value, blood sugar value and other items of said person.

13. The method according to claim 12, wherein said extracted information of said first and second desired portions, respectively reproduced in said first and second reproducing steps, include at least data about said weight, blood pressure value and blood sugar value of said person for each medical checkup among said information on a plurality of medical checkups.

14. The method according to claim 11, comprising recording said information on an optical card recording medium.

* * * * *